United States Patent [19]
Green et al.

[11] Patent Number: 5,249,903
[45] Date of Patent: Oct. 5, 1993

[54] ROUND BALE HANDLING EQUIPMENT

[75] Inventors: Peter J. Green; Vincent P. Green, both of Lutterworth, England

[73] Assignee: Four-Gee Design Limited, Leicestershire, England

[21] Appl. No.: 660,259

[22] Filed: Feb. 26, 1991

Related U.S. Application Data

[63] Continuation of Ser. No. 375,206, Jun. 30, 1989, abandoned.

[30] Foreign Application Priority Data

Jul. 2, 1988 [GB] United Kingdom ............... 8815773

[51] Int. Cl.$^5$ .................................................. B60P 1/00
[52] U.S. Cl. ................... 414/24.5; 414/111; 414/459; 414/470; 414/552
[58] Field of Search .............. 414/24.5, 24.6, 111, 414/470, 482, 551, 552, 786, 911, 546, 554, 556, 471, 483, 459, 460

[56] References Cited

U.S. PATENT DOCUMENTS

| | | | |
|---|---|---|---|
| 2,480,392 | 8/1949 | Alves | 414/470 X |
| 4,204,789 | 5/1980 | Parks, Jr. | 414/459 X |
| 4,204,790 | 5/1980 | Baxter | 414/459 X |
| 4,261,676 | 4/1981 | Balling, Sr. | 414/470 X |
| 4,266,898 | 5/1981 | Jacobsen et al. | 414/459 X |
| 4,411,571 | 10/1983 | Gildon | 414/551 X |
| 4,459,075 | 7/1984 | Eichenberger | 414/552 X |
| 4,500,242 | 2/1985 | Beikman | 414/24.5 |
| 4,630,986 | 12/1986 | Taylor | 414/552 X |

FOREIGN PATENT DOCUMENTS

| | | | |
|---|---|---|---|
| 1569416 | 6/1980 | United Kingdom | 414/24.5 |
| 2156308 | 10/1985 | United Kingdom | |

Primary Examiner—David A. Bucci
Assistant Examiner—Janice Krizek
Attorney, Agent, or Firm—Banner, Birch, McKie & Beckett

[57] ABSTRACT

Apparatus for collecting grassland bales comprises a pair of open-ended cradle structures (42, 44) each of which is pivotally mounted on each of two opposite sides of a trailer (10). The cradles can be lowered from an inboard stowed position into an inverted position by pivoting the cradles relative to the trailer so that the cradles are lowered to collect a load. The cradles can lift the load into a stowed position by being raised inboard of the trailer.

10 Claims, 3 Drawing Sheets

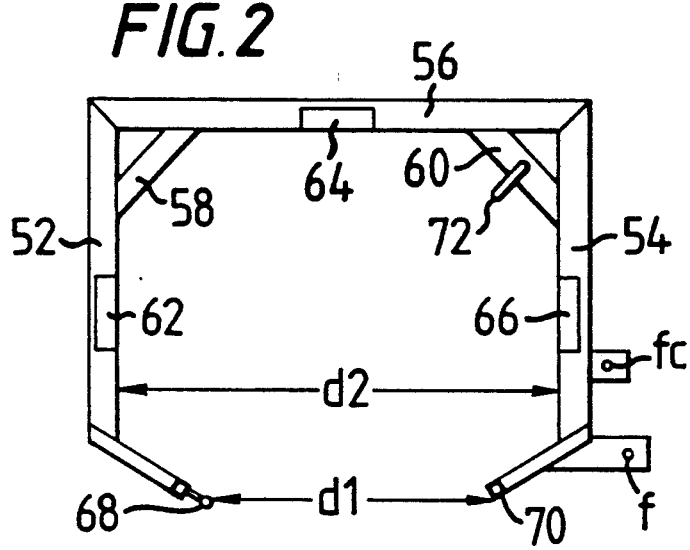
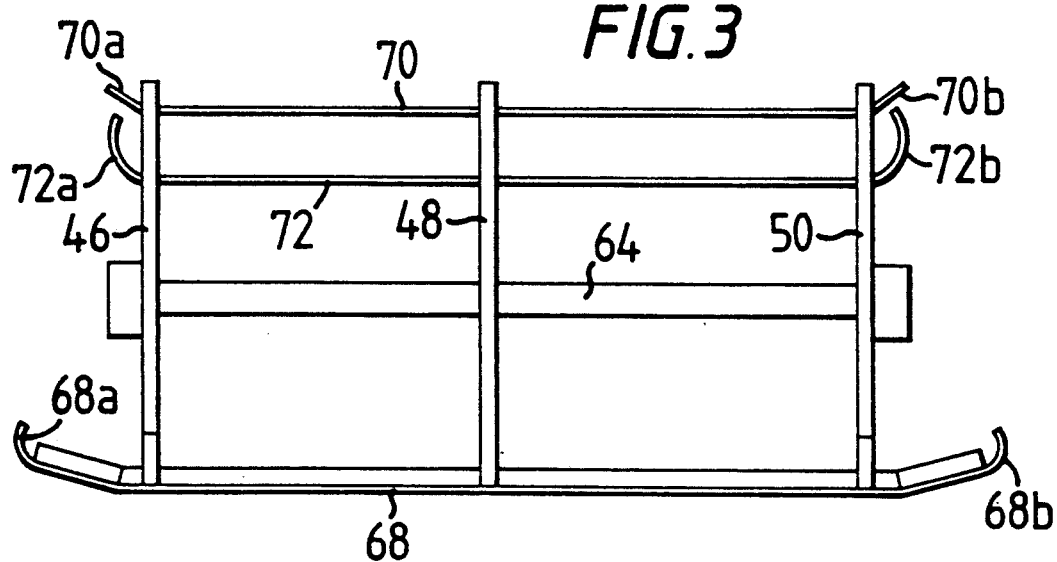

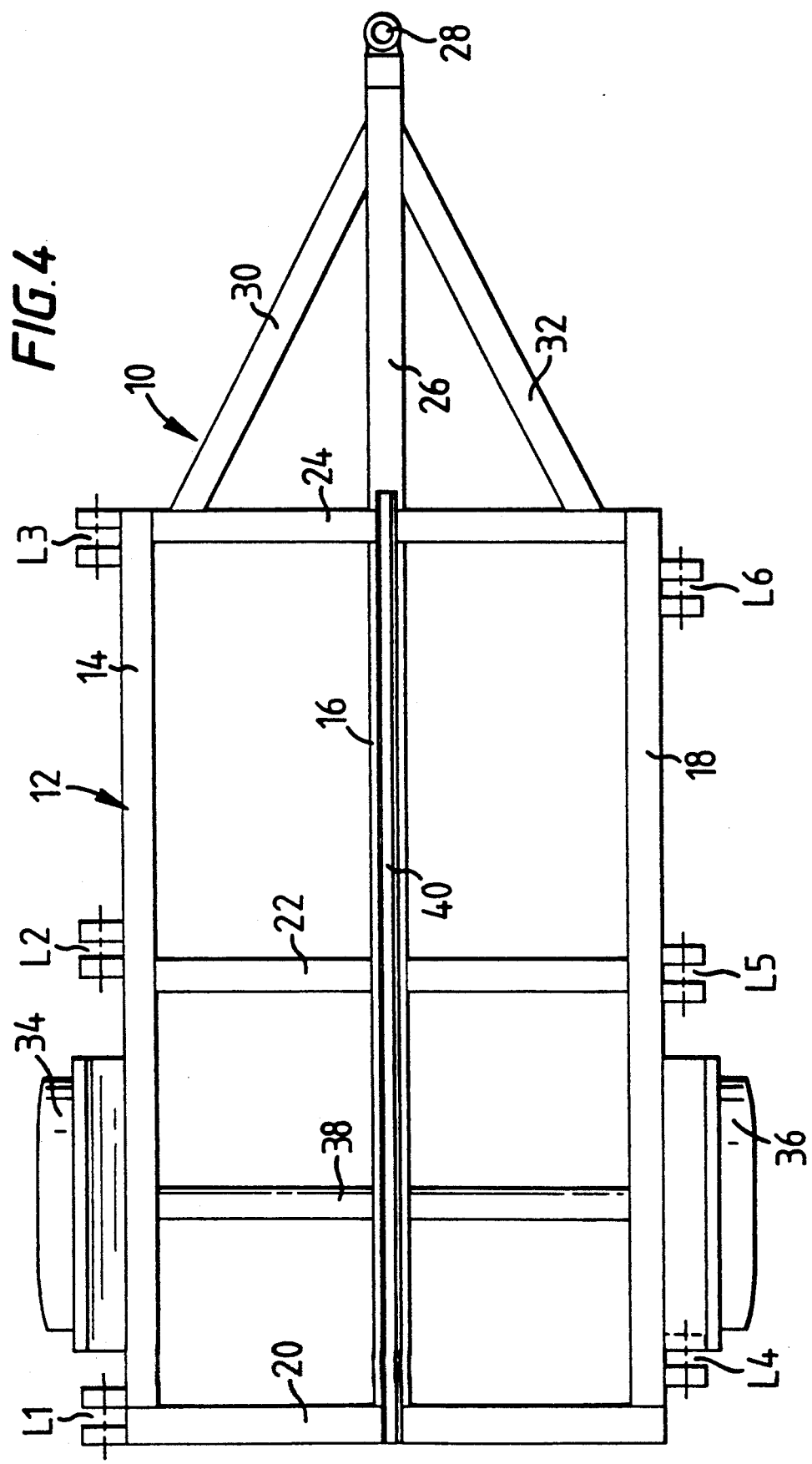

ROUND BALE HANDLING EQUIPMENT

This application is a continuation of application Ser. No. 07/375,206, filed Jun. 30, 1989, now abandoned.

This invention relates to equipment for handling grassland bales particularly large cylindrical bales of hay or straw. One known type of bale handling equipment comprises a trailer for towing behind a tractor and which includes a series of spike carrying arms which can be lowered and raised along each side of the trailer. When an arm is in its lowered position, its spike is rammed into the end face of a cylindrical bale by forward movement of the trailer so that the bale becomes impaled upon the spike. The arm can then be raised to lift the bale so that it can be shifted to another location. In order to deposit the bale, the spiked arm is lowered and it is then necessary to reverse the trailer relative to the bale so as to withdraw the spike from the bale. Of course if the bale includes any form of wrap which covers the bale ends this will be punctured by the spike.

Another known type of bale handling equipment comprises a trailer for towing behind a tractor which trailer has a rear end adapted to provide a pair of spaced arms. The trailer includes a rear set of wheels which are retractable to cause the trailer to 'kneel' whereafter it is reversed to gather the bale between the rear arms. Further bales may be gathered by causing a preceding bale to be displaced along the trailer.

It will be appreciated that in order to load a bale onto the trailer of this equipment it is necessary to reverse the trailer relative to the bale. Of course the loaded bale impairs ones vision in reversing and loading the next succeeding bale.

The present invention seeks to overcome the shortcomings of these known constructions by handling equipment that readily collects such bales without involving the reversing of a trailer for loading or unloading and without damage to the bales or any covering applied to the bales.

One aspect of the present invention provides a method of collecting grassland bales in which an open-ended cradle structure is adapted to be disposed about a bale while the bale is in ground contact by moving the cradle while in a lowered position relative to the bale so that the bale passes through an open end of the cradle and thereafter raising the cradle in such a manner that the bale is lifted clear of the ground by the cradle and is transferred from lifting surfaces of the cradle to support surfaces of the cradle on which the bale is held supported when the cradle is raised.

According to a feature of this aspect of the invention said cradle may be pivoted through an arc from a raised stowed position to a lowered position and vice versa, said bale being transferred by rolling from said lifting surfaces to said support surfaces during pivotal movement to raise the cradle.

Another aspect of the invention provides an apparatus for collecting grassland bales comprising an open-ended cradle structure in which a bale can be lifted and transported, means to move said cradle structure from a stowed position in which it is raised clear of the ground to a lowered position in which it can be manoevered so that it is disposed about a bale while the bale is in ground contact by advancing the cradle so that the bale is entered through an open end of the cradle and thereafter to return the cradle to its stowed position whereby the bale is lifted by and held supported in said cradle.

According to a feature of this aspect of the invention one of said cradles may be pivotally mounted on each of two opposite sides of a trailer such that they are lowered into an inverted position by rotating relative to the trailer alongside that side of the trailer to which the cradle is attached and stowed by being raised inboard of the trailer. Preferably, each cradle is generally C or U-shaped in end elevation and inverted when in its lowered position and wherein means are provided partially to close the mouth of the C or U so that a bale present in the cradle cannot pass through the mouth of the C or U when the cradle is lifted. Where this feature is adopted, said closing means comprise elongate guides which extend the length of each cradle, said cradle further comprising a series of spaced C or U-shaped frame elements and in which one guide connects together the free ends of the arms of the C or U-shaped frame elements along one side of the cradle and another guide connects together the free ends of the arms of the C or U-shaped frame elements along the opposite side of the C or U-shaped frame elements. In constructions wherein this feature is adopted a further guide extends the length of the cradle and interconnects each of said U-shaped frame members adjacent each of their inboard corners, said further guide providing a support surface on which a bale rests when the cradle is in its raised stowed position.

Preferably, the C or U-shaped frame members of one cradle are arranged partially to interdigitate with the C or U-shaped frame members of the other cradle when both cradles are in their stowed positions.

It is also preferred that each cradle is adapted to accommodate and lift a plurality of cylindrical grassland bales.

An embodiment of the invention will now be described, by way of example, with reference to the accompanying drawings, in which:

FIG. 2 is an end elevation of one of the bale collecting cradles; and

FIG. 3 is a side elevation of the cradle; and

FIG. 4 is a plan view of the trailer with the cradles omitted.

Figure 1:
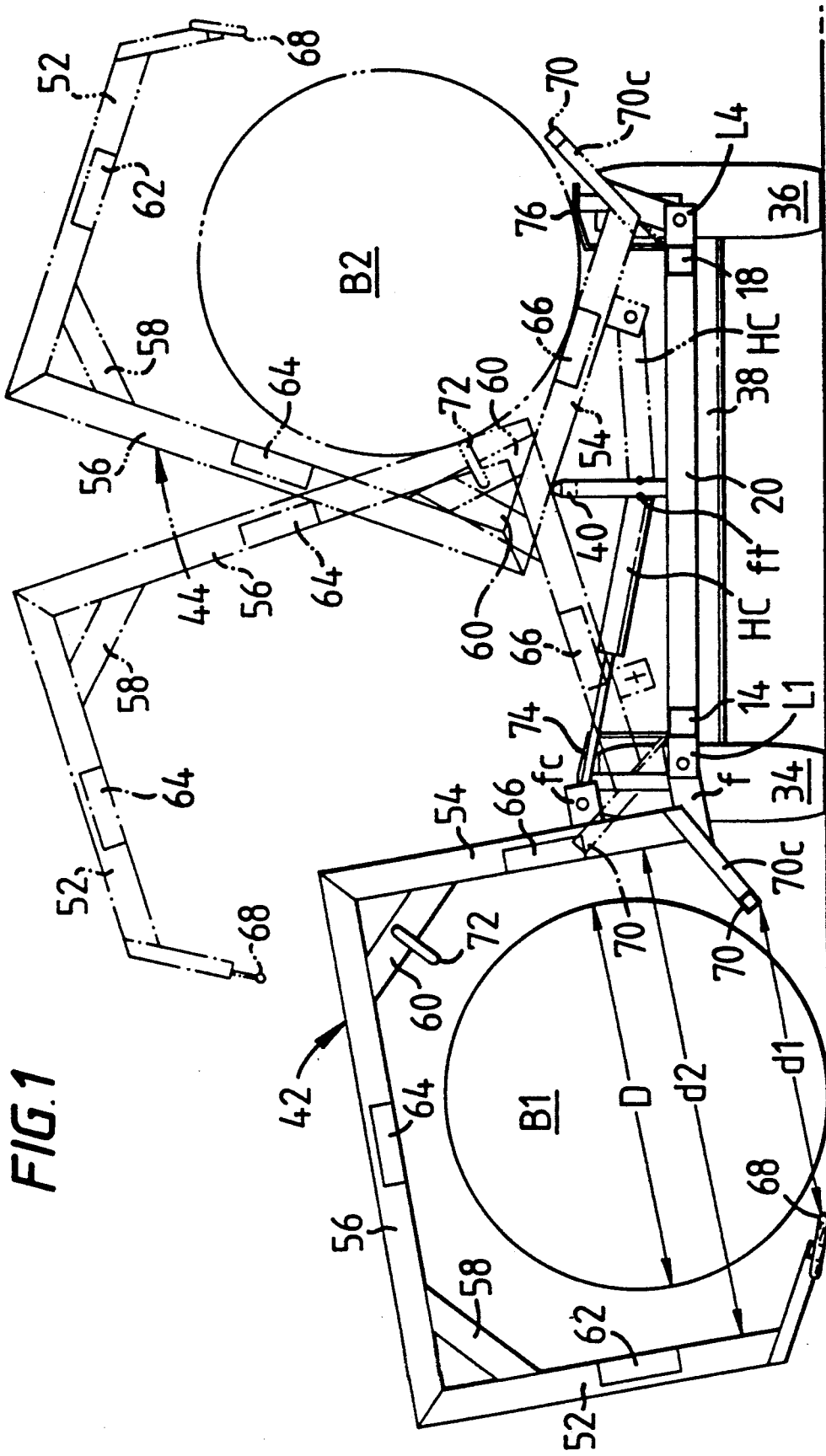
FIG. 1 is an end elevation of equipment according to the invention comprising a trailer in which a side mounted bale collecting cradle is shown lowered for collecting at the left hand side and raised into a stowed position at the right hand side.

Referring to the drawings, a trailer 10 adapted to be towed, eg. by a tractor includes a mainframe 12, incorporating parallel longitudinal frame members 14,16 and 18 and parallel transverse frame members 20,22 and 24. At its front end the trailer includes a tow bar structure comprising tow bar 26, formed by an extension of longitudinal frame member 16, which terminates in eye 28, and support struts 30 and 32 which interconnect the tow bar and transverse frame member 24. Adjacent its opposite end the trailer incorporates a pair of wheels 34 and 36 interconnected by axle 38. Central longitudinal frame member 26 supports a superposed bar 40 which provides a stop for the bale collecting cradles when stowed.

At spaced locations along each of the sides of the trailer attachment lugs L1–L6 are provided on longitudinal frame members 14 and 18 to which the bale collecting cradles 42 and 44 are pivotally attached. FIGS. 2 and 3 depict one of the bale collector cradles 42 of the equipment each of which comprises a U-shaped form. Cradle 42 comprises a set of three like U-shaped frame elements 46, 48 and 50 each of which comprises arms 52 and 54 coupled by a crosspiece 56 thereby forming a U-shaped frame. However, it is envisaged that a more rounded cradle having a C-shaped form by utilising C-shaped frame elements is a preferable arrangement to prevent damage to the bales or plastics coverings applied to the bales. Strengthening struts 58 and 60 connect together with the crosspiece and the arms in the opposite corners of the frame.

The U-shaped frames 46, 48 and 50 are connected together at spaced locations by longitudinal ties 62, 64 and 66 which interconnect arms 52, crosspieces 56 and arms 54, respectively, to form an open ended structure. The mouth of the structure between the free ends of the arms of the U-shaped frames is partially closed by a pair of elongate skids 68 and 70 which interconnect arms 62 and 66, respectively of frames 46, 48 and 50 thereby forming a cradle in which the mouth of the cradle as measured by the distance d1 between the skids is less than that distance d2 between the arms of the cradle. Thus a bale having a diameter D can be held in the cradle when in an inverted position resting on the skids without being able to pass through the mouth of the cradle. Thus $d_1 < D < d_2$.

It is envisaged that the distance d1 could be made adjustable in some constructions for instance by causing the skids 68 and 70 e.g. by pneumatic or hydraulic means to be movable towards or away from one another thereby to alter the size of the mouth of the cradle.

A further elongate skid 72 extends the length of the cradle and interconnects all the corner struts 60. All the skids have outwardly turned ends, ie. 68a, 68b; 70a, 70b and 72a, 72b to facilitate the introduction of a cylindrical bale into the cradle from either of its open ends.

The cradle 42 includes a series of three flanges 'f' which are pivotally connected to lugs L1–L3 or L4–L6 to mount the cradle onto the trailer. In order to actuate the cradle so that it can be moved from a stowed position to a lowered position a pair of hydraulic cylinders e.g., cylinder HC which interconnects flanges fc and ft provided by the cradle and trailer respectively.

In order to collect bales, e.g., from a field the trailer is towed to the collecting area and one or both cradles are lowered by actuating the appropriate hydraulic cylinders so that each cradle pivots from its inboard stowed position to its outboard lowered position in which the cradle is inverted with guide skids 68 and 70 at or near the ground. Preferably both cradles are lowered together so that the trailer is kept more evenly balanced and so that one cradle in its lowered condition provides a counterweight for the opposite cradle during loading of the opposite cradle. A lowered cradle is then aligned with a bale and the cradle advanced so that the bale enters through the leading open end of the cradle with the guide skids 68, 70 passing along the cylindrical wall of the bale adjacent its point of contact with the ground. Where circumstances demand it the trailer can be reversed so that a bale is collected through the trailing open end of the cradle. Second and subsequent bales can then be introduced into the cradle in like manner so that each bale which enters the cradle displaces the or each other bale therein so that a plurality of bales can be accommodated within the cradle. As the cradle is lifted to raise a bale clear of the ground the load of the bale is transferred to the guides 68 and 70 which as mentioned prevent the bale from falling through the mouth of the cradle. In order to bring the bale or bales into a stowed condition for transfer to some other location the cradle is raised and as it pivots upwardly and inwardly of the trailer each bale is rolled inwardly so that the load of the bale is transferred from guides 68 and 70 to guides 72 and the surfaces of longitudinal number 66 and fixed frame elements 74, 76. Thus, the deadload of the bale when in its stowed inboard condition has its center of gravity within the wheel span of the trailer. When both cradles are raised into their stowed condition the U-shaped frame elements of one cradle partially interdigitate with those of the other cradle as shown in FIG. 1 and nest against the centre stop 40. Of course, if hydraulic power failed the cradles would remain stowed since they are in stable equilibrium in that condition.

In order to unload a cradle the hydraulic rams are actuated in order to pivot the cradle in the opposite direction from its stowed position to its lowered position until such time as the bale or bales contact the ground. The cradle is then shifted relative to each bale until it is clear either by advancing or reversing the trailer so that each bale passes through one or other of the open ends of the trailer.

We claim:

1. Apparatus for collecting grassland bales comprising:
   an open-ended cradle structure in which a plurality of bales can be lifted from a lowered position in which the bales are in contact with the ground to a raised stowed position and transported,
   said cradle structure comprising a cage which has lifting surfaces, said lifting surfaces having a length sufficient to simultaneously lift a plurality of bales, said lifting surfaces lifting the bales out of contact with the ground and defining a mouth of said cradle structure, said mouth being the space between said lifting surfaces which is substantially constant while lifting the bales out of contact with the ground and less than the diameter of the bales, said mouth facilitating the disposition of said cradle structure about the bales while the bales are in ground contact,
   said cradle structure further comprising support surfaces, said support surfaces having a length sufficient to simultaneously support a plurality of bales, said support surfaces supporting bales transferred from said lifting surfaces when said cradle structure is raised into the stowed position, and
   means for moving said cradle structure between the lowered position and the stowed position, a first of said plurality of bales entering said cradle structure through an open end thereof while said cradle structure is in the lowered position and a second of said plurality of bales entering said cradle structure through the open end thereof while the first of said plurality of bales remains within said cradle structure.

2. Apparatus according to claim 1 wherein a plurality of cradle structures are provided.

3. Apparatus according to claim 2 further comprising a trailer, wherein one of said plurality of cradle structures is pivotally mounted on one of two opposite sides of the trailer such that each cradle structure is lowered into an inverted position by rotating relative to the trailer alongside that side of the trailer to which the respective cradle structure is attached and stowed by being raised substantially inboard of the trailer.

4. Apparatus according to claim 3, wherein said lifting surfaces comprise a first elongate guide and a second elongate guide, both of which extend the length of each cradle structure, said cradle structure further comprising:

a series of spaced C- or U-shaped frame elements having arms with free ends, wherein said first guide connects together the free ends of the arms of the C- or U-shaped frame elements along one side of the cradle structure and said second guide connects together the free ends of the arms of the C- or U-shaped frame elements along the opposite side of the cradle structure.

5. Apparatus according to claim 2 wherein each cradle structure is generally C- or U-shaped in end elevation and inverted when in its lowered position, wherein said mouth of said cradle structure is in a downwardly facing attitude when said cradle structure is in the lowered position.

6. Apparatus according to claim 5, wherein said cradle structures comprise C- or U-shaped frame members.

7. Apparatus according to claim 6 wherein a guide extends the length of the cradle structure and interconnects each of said C- or U-shaped frame members, said guide providing a support surface on which a bale rests when the cradle structure is in its raised stowed position.

8. Apparatus according to claim 6, wherein the C- or U-shaped frame members of one cradle structure are arranged to partially interdigitate with the C- or U-shaped frame members of another cradle structure when both cradle structures are in their stowed positions.

9. Apparatus according to claim 2 wherein each cradle structure is adapted to accommodate and lift a plurality of cylindrical grassland bales.

10. Apparatus for collecting grassland bales comprising:

an open-ended cradle structure in which a plurality of bales can be lifted from a lowered position in which the bales are in contact with the ground to a raised stowed position and transported, said cradle structure comprising a cage which has lifting surfaces, said lifting surfaces having a length sufficient to simultaneously lift a plurality of bales, said lifting surfaces defining a mouth of said cradle structure which facilitates the disposition of said cradle structure about the bales while the bales are in ground contact, said lifting surfaces lifting the bales out of contact with the ground, said cradle structure further comprising support surfaces, said support surfaces having a length sufficient to simultaneously support said plurality of bales, said support surfaces supporting bales transferred from said lifting surfaces when said cradle structure is raised into the stowed position, and means for moving said cradle structure between the lowered position and the stowed position, a first of said plurality of bales entering said cradle structure through an open end thereof while said cradle structure is in the lowered position and a second of said plurality of bales entering said cradle structure through the open end thereof while the first of said plurality of bales remains within said cradle structure, wherein said lifting surfaces are spaced apart by a fixed distance so that bales received in said cradle structure cannot pass through the cradle mouth.

* * * * *